H. H. SONNIKSEN.
Stovepipe Drum.

No. 57,778.

Patented Sept. 4, 1866.

Witnesses:

Inventor:
Hans Henrik Sonniksen.

UNITED STATES PATENT OFFICE.

HANS HENRIK SENNIKSEN, OF RICHMOND, INDIANA.

STOVE-PIPE DRUM.

Specification forming part of Letters Patent No. 57,778, dated September 4, 1866.

*To all whom it may concern:*

Be it known that I, HANS HENRIK SENNIKSEN, of Richmond, Indiana, have invented certain new and useful Improvements in Dampers and Heaters for Stoves; and I do hereby declare the following to be a full, clear, and exact description thereof, reference being had to the accompanying drawings and letters of reference marked thereon.

Figure 1:
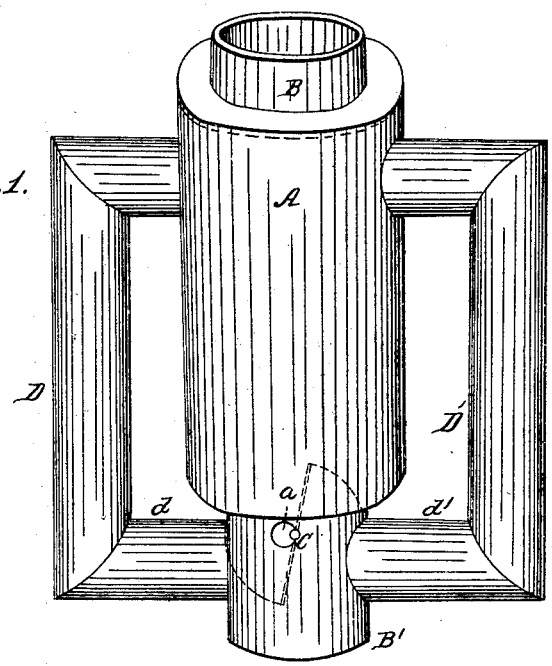
Figure 2:
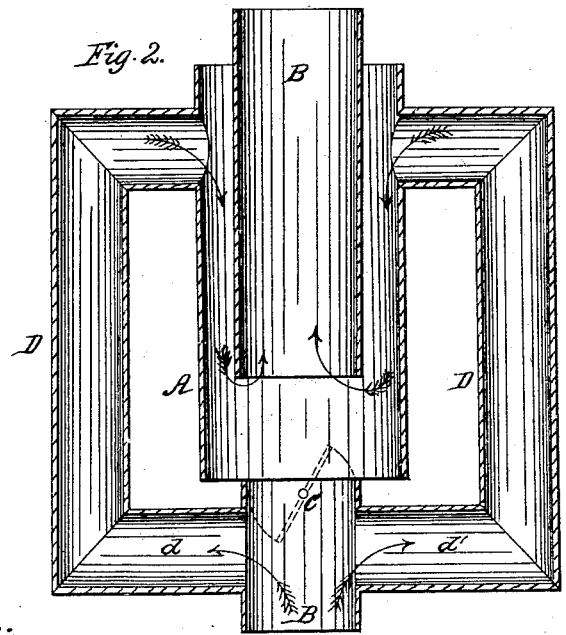

In the drawings, Figure 1 is an elevation of my invention. Fig. 2 is a vertical section of the same.

In Fig. 1, A is the body of the heater. B' is the pipe leading into the same from the stove, and B is the pipe leading out from the heater. C is a revolving damper, closing the pipe B' above its junction with the side pipes, $d$ and $d'$, which connect with the upright pipes D and D', and which serve to carry the heat by means of said pipes around right and left into the chamber of the heater, as shown by the arrows, passing therein downward to the bottom of the pipe B, when it ascends through that pipe and passes out.

When the damper C is turned up, as shown in the drawings, the current of heat passes directly up through B' and B, as though no heater was in connection; but when turned down, as shown in the dotted lines, the heat passes through the side pipes into the chamber, and the heat is thrown off, enabling the operator to throw off the heat or to promote the draft, as may be desired.

Having thus fully described my said improvement, what I claim as new, and desire to secure by Letters Patent, is—

The combination of the pipes B and B', D and D', $d$ and $d'$, and the damper C, when arranged and operated as set forth and described.

HANS HENRIK SENNIKSEN.

Witnesses:
 WM. T. DENNIS,
 J. STOVER.